United States Patent [19]
Garrick et al.

[11] 4,078,809
[45] Mar. 14, 1978

[54] SHAFT SEAL ASSEMBLY FOR A ROTARY MACHINE

[75] Inventors: Joseph C. Garrick; J. Thomas Keenan, both of Jeannette, Pa.

[73] Assignee: Carrier Corporation, Syracuse, N.Y.

[21] Appl. No.: 759,693

[22] Filed: Jan. 17, 1977

[51] Int. Cl.² .............................................. F16J 15/40
[52] U.S. Cl. .......................................... 277/1; 277/2; 277/3; 277/15; 277/27; 277/29
[58] Field of Search ........... 277/1, 3, 15, 27, 142–144, 277/29, 152, 28, 59, 65, 17, 74, 75, 81 R, 53, 135, 2, 212 F

[56] References Cited

U.S. PATENT DOCUMENTS

| | | | |
|---|---|---|---|
| 1,841,863 | 1/1932 | Van Rijswijk | 277/15 |
| 3,131,939 | 5/1964 | Cuny | 277/15 |
| 3,508,758 | 4/1970 | Strub | 277/15 |
| 3,533,635 | 10/1970 | Godin et al. | 277/15 X |
| 3,695,621 | 10/1972 | Damratowski et al. | 277/212 F X |
| 3,740,057 | 6/1973 | Doyle et al. | 277/3 |
| 3,831,381 | 8/1974 | Swearingen | 277/15 X |
| 3,906,730 | 9/1975 | Bellati et al. | 277/15 X |
| 3,926,442 | 12/1975 | Muller | 277/27 X |
| 3,937,022 | 2/1976 | Swearingen | 277/15 X |
| 4,005,580 | 2/1977 | Swearingen | 277/15 X |

FOREIGN PATENT DOCUMENTS 376,035  7/1932  United Kingdom .................... 277/2

Primary Examiner—Robert S. Ward, Jr.
Attorney, Agent, or Firm—J. Raymond Curtin; Barry E. Deutsch

[57] ABSTRACT

A shaft seal system to prevent pressurized working substances contained within a rotary machine from escaping to surrounding areas of relatively lower pressure includes a first seal disposed between a high pressure region and a first region operating at a relatively lower substantially constant pressure. A second seal is disposed between the high pressure region and a second region operating at a relatively lower variable pressure. Sealing fluid is delivered to the high pressure region whereat the fluid flows axially in opposite directions along the shaft to the first and second regions. The flow of fluid toward the second region is restricted to a greater degree than the flow of fluid toward said first region. Changes in the flow of fluid through said first and second seals to the first and second regions resulting from changes in the operating pressure of the second region are monitored. A valve regulates the flow of sealing fluid to the high pressure region in accordance with the monitored changes in fluid flow to maintain a substantially constant flow of fluid toward the first region irrespective of changes in the operating pressure of the second region.

4 Claims, 2 Drawing Figures

SHAFT SEAL ASSEMBLY FOR A ROTARY MACHINE

BACKGROUND OF THE INVENTION

This invention relates to a seal system for rotary machines and in particular to a seal system which maintains a positive seal for process gas conditions that may fluctuate from a vacuum to a substantial positive pressure.

Sealing systems employing "liquid-to-gas" seals to prevent high pressure working substances contained within a rotary machine, such as a turbine or compressor, from escaping about the shaft to regions of lower pressure or to the atmosphere are quite extensively commercially employed. The term "liquid-to-gas" seal, as used herein, generally refers to a sealing system utilizing a pressurized substance which acts as a dam against the working substances to prevent the working substance from passing into a region of lower pressure. It should be understood that the term "liquid-to-gas" is broad enough to include any fluid-to-fluid arrangement capable of producing the desired results.

In some process gas applications, it is essential that the seal fluid be isolated from the process gas. To achieve the desired total segregation, a small volume of process gas is injected between the process gas and the seal fluid to establish a buffer or barrier. The buffer gas is at a slightly higher pressure than the seal fluid, insuring that the seal fluid will not contaminate the process gas.

In some applications, the process gas inlet pressure may vary from a vacuum to a relatively substantially positive pressure. Generally, the buffer gas is injected at a relatively high pressure region of the rotary machine. From the injection point, the buffer gas flows axially in opposite directions along the shaft of the machine. In one direction of flow, the gas establishes the barrier to the seal fluid, whereas in the other direction of flow, the buffer gas is generally returned to the inlet or other lower pressure region of the machine for mixture with the process gas. Generally, labyrinth or similar flow restricting seals are interposed between the injection region and the inlet and seal fluid barrier regions to limit the quantity of buffer gas required to establish the desired fluid barrier.

However, in applications wherein the inlet pressure may vary from a vacuum to a relatively substantially positive pressure, the typical buffer gas arrangement of the type described has not proven totally satisfactory.

In arrangements of the prior art, if the quantity of buffer gas supplied to the barrier region is established when the inlet pressure is under vacuum conditions, then an excessive quantity of buffer gas will be supplied to the barrier region when the inlet pressure reaches a relatively substantial positive pressure. In addition, as the inlet gas pressure increases, there exists a possibility that lower pressure at the barrier region will result in the flow of process gas toward the seal fluid injection region thereby causing possible problems, such as solidification of the seal fluid. Conversely, if the quantity of buffer gas delivered to the injection region is determined when the inlet pressure is at a relatively substantial positive pressure, then there exists a strong probability that an insufficient quantity of buffer gas will flow to the barrier region when the inlet pressure is reduced, thereby permitting the seal fluid to mix with and perhaps contaminate the process gas.

Essentially, the variations in flow to the barrier region are caused by the variations in the inlet pressure of the process gas. As inlet pressure decreases, and in some instances approaches or becomes a vacuum, there is an increase in the flow of buffer gas from the injection region to such low pressure region due to the substantial pressure differential therebetween. If the supply of buffer gas to the injection region is determined when the process gas inlet pressure is at a relatively substantial positive pressure, and the flow of gas to the injection region remains constant, there will be insufficient flow of buffer gas to the barrier region when the inlet pressure decreases. Conversely, as the inlet pressure increases, the pressure differential between the injection region and the region functioning at inlet pressure decreases causing a concomitant reduction in flow of buffer gas to such region. If the supply of buffer gas to the injection region remains constant, there is a resultant increase in the flow of buffer gas to the barrier region. Since the buffer gas mixes with the sealing fluid in the barrier region, the gas forming the barrier becomes contaminated. An excessive flow of buffer gas to the barrier region thus reduces the efficiency of operation of the system utilizing the rotary machine.

SUMMARY OF THE INVENTION

It is therefore an object of the invention to improve shaft sealing apparatus employed in a pressurized rotary machine.

It is a further object of the present invention to maintain a relatively minimum flow of buffer gas to a barrier region regardless of changes in pressure in a relatively low pressure region communicating with the buffer gas injection zone.

It is a still further object of the present invention to maintain a reasonable level of buffer gas flow, yet maintain a positive barrier to prevent seal fluid from contaminating a process gas, for process gas conditions that may vary from a vacuum to a relatively substantial positive pressure at the inlet to a rotary machine.

Yet another object of the present invention is to monitor changes in the flow of buffer gas to a barrier region and to regulate the flow of buffer gas to an injection region to maintain the flow rate of buffer gas to the barrier region at a substantially minimum level.

These and other objects of the present invention are attained in a seal system for a rotary machine including a first seal disposed between a high pressure region and a first region operating at a relatively lower constant pressure. A second seal is disposed between the high pressure region and a second region operating at a varying, relatively lower pressure. A buffer gas is delivered to the high pressure region whereat the gas flows axially in opposite directions along the shaft to the first and second regions. The flow of gas toward the second region is restricted to a greater degree than the flow of gas toward said first region. Changes in the flow of gas through said first and second seals to the first and second regions resulting from changes in the operating pressure of the second region are monitored. A valve regulates the flow of buffer gas to the high pressure region in accordance with the monitored changes in flow to maintain the flow of fluid toward the first region at a substantially minimum rate irrespective of changes in the operating pressure of the second region.

DESCRIPTION OF THE PREFERRED EMBODIMENT

Figure 2:
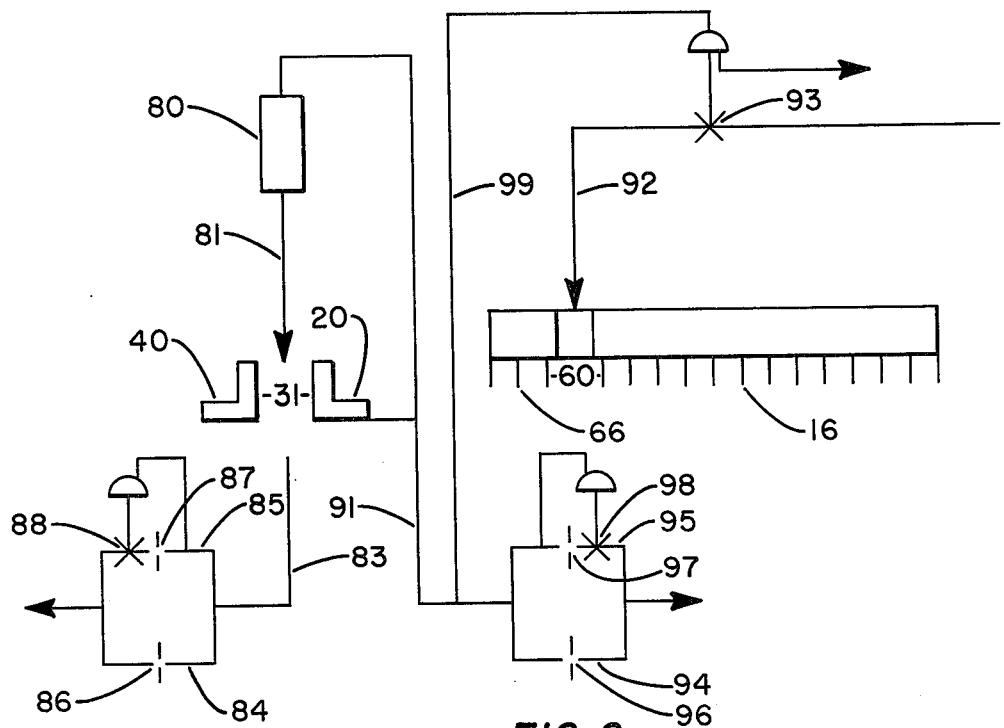
FIG. 2 is a schematic representation of the seal system disclosed in FIG. 1.

Referring now to the drawings, there is disclosed a preferred embodiment of the present invention. In referring to the several figures of the drawings, it should be understood like numerals shall refer to like parts.

Figure 1:
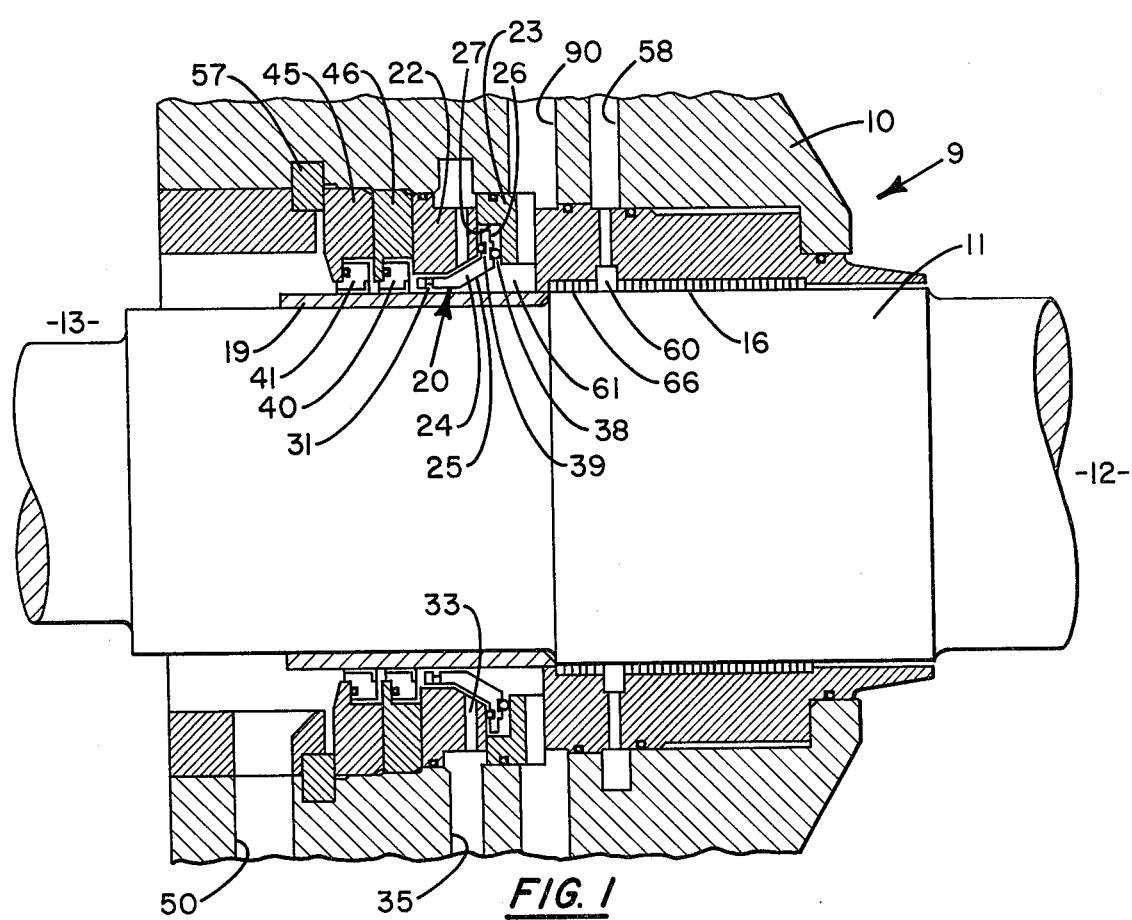
FIG. 1 is a partial sectional view of a rotary machine employing the teachings of the present invention.

As illustrated in FIG. 1, an end wall structure 10 of a rotary machine 9, such as a compressor or a turbine, is provided with an aperture through which passes a rotary shaft 11 for supporting the moving components of the machine. The shaft is arranged to extend in an axial direction from a high pressure region of the machine, generally referenced 12, to a low pressure region, generally referenced 13. Conventionally, the low pressure region is at atmospheric pressure, although slightly higher or lower pressures can be maintained without departing from the teachings of the present invention. Suitable seal members, as for example labyrinth seal member 16 encircle shaft 11 within high pressure area 12. The function of seal member 16 will be more fully discussed hereinafter.

Rotary machine 9 includes additional sealing members. Such sealing members include annular stator members 22 and 23 positioned in the end wall opening in abutting relation with respect to each other. A gas side seal, which is generally referenced 20, is carried within the stators and is arranged to encompass shaft 11. The gas side seal includes a cylindrical sleeve-like bushing 24, which encircles the shaft with a clearance therebetween and a ramp section 25 obliquely disposed from the cylindrical sleeve, which merges with a radially extended flange 26 positioned below a flangelike portion 27 of stator member 23.

The interior structure of stator members 22 and 23 is formed to complement the shape of the gas side seal. As will be explained in greater detail below, oil under high pressure is supplied to circumferentially extending groove 33 via an oil inlet channel 35 passing through end wall structure 10.

A pair of O-rings 38 and 39 are positioned on opposite sides of flange 26 of the gas side seal and serve to prevent high pressure oil from moving between stator members 22 and 23. A series of pins, not shown, secured in stator member 23, extend downwardly into horizontal grooves formed in the outer periphery of flange 26 to prevent the gas side seal from rotating while at the same time, permitting the seal to float in both an axial and a radial direction.

In operation, high pressure oil, which is maintained at a pressure slightly above the working pressure of the process gas, is introduced into channel 33 and carried into contact with the shaft above sleeve 19 in the general region designated 31.

The high pressure oil in region 31 flows axially in opposite directions along shaft 11. The oil flowing toward the high pressure region 12 acts as a barrier to prevent process gas from leaking about the shaft into regions of lower pressure. The high pressure oil moving along the shaft surface toward the low pressure side of the rotary machine passes through a series of breakdown seals, in the form of free floating sleeves 40 and 41. These sleeves are equally spaced in axial alignment about the shaft behind gas side seal 20. Sufficient spacing is provided between the interior surface of the breakdown seals and the outer periphery of the shaft whereby the pressure in the flow stream is periodically and uniformly reduced as it moves into the region of lower pressure. The breakdown seals are mounted within annular stators 45 and 46, supported within the shaft opening. As illustrated in FIG. 1, the stators are mounted in axial abutting alignment with the last stator in the series, stator 46, contacting the outer face of gas side seal stator 22. The breakdown seal stators are restrained against axial movement within the shaft opening by means of a retaining ring 57 fitted to the lefthand face of the end wall structure. The oil passing through the last of the breakdown sleeves is drained via an oil drain channel 50 passing through the machine end wall structure. Drain 50 delivers the oil to a suitable storage vessel (not shown).

In some applications, the high pressure seal oil flowing towards high pressure region 12 can mix with the process gas without adversely affecting the gas. However, in other applications it is essential that the seal oil be prevented from mixing with and contaminating the process gas. Accordingly, in such applications, a buffer fluid is injected via a buffer gas inlet channel 58 passing through the machine end wall structure. The buffer fluid is typically process gas, maintained at a pressure slightly above the working gas pressure and also slightly above the pressure of the seal oil.

The buffer gas is injected into a high pressure injection region or zone 60 from where the gas flows axially in opposite directions along shaft 11. The gas flowing toward low pressure region 13 is restricted by labyrinth seal 66, disposed at the interface region 61 defined by the junction of the counter flowing buffer gas and seal oil. The pressure of the buffer gas flowing into the interface region prevents the seal oil from passing into the high pressure zone to possibly contaminate the process gas. The buffer gas essentially establishes a barrier at the oil-gas interface to prevent the oil from flowing past the interface area.

The buffer gas flowing axially toward high pressure region 12 passes through labyrinth seal 16. It should be observed that labyrinth seal 16 is longer than seal 66. Thus, the buffer gas passing through seal 16 will be restricted to a greater degree than will the gas flowing through seal 66.

In some process gas applications, the suction pressure will remain constant; however, in other applications, the process gas inlet pressure may vary from vacuum to a relatively substantial positive pressure condition. In applications of this type, the variations in inlet pressure have produced problems with respect to efficient and effective operation of the buffer gas system. For example, if the supply of buffer gas necessary to maintain an effective barrier has been determined with the inlet at a vacuum, problems result when the inlet pressure substantially increases. With the pressure differential between the buffer gas injection region and the region operating at inlet pressure being relatively small, the flow through the labyrinth seal provided therebetween is minimal. Under such conditions, if the quantity of buffer gas delivered to the injection zone is maintained constant, there is a resultant increase in the flow of buffer gas to the barrier region. Since this gas becomes contaminated when mixed with the seal fluid in the barrier zone, the process gas employed as the buffer fluid becomes unusable, thereby reducing the efficiency of the total system.

Conversely, if the supply of buffer gas to the injection region is determined when the inlet pressure is at a substantial positive pressure, then as the inlet pressure decreases, and the pressure differential between the injection zone and zone operating at or near suction or inlet pressure increases, there is a resultant increase in the flow of buffer gas toward such low pressure zone and a decrease in the flow of buffer gas to the barrier region. Under such conditions, the quantity of gas passing to the barrier region may be insufficient to establish the necessary pressure to prevent the seal fluid from passing into the high pressure region of the rotary machine and therein mixing with and contaminating the process gas.

With reference to FIG. 2, the operation of the seal system of the present invention will be explained in detail. Seal oil is contained within storage tank 80 and is delivered via line 81 to oil inlet channel 35 (shown in FIG. 1). The seal oil is thereafter delivered to region 31 from whence the oil flows axially in opposite directions along shaft 11 via seals 40, 41, and 20. To insure that there will be an adequate supply of oil to the seals to develop the desired liquid barriers, the quantity of oil actually supplied via line 81 is in excess of actual seal requirements. The excess oil is by-passed via conduit 83 which terminates in a pair of parallel conduits 84, 85. Each of the parallel conduits has a flow control orifice 86, 87 disposed therein. A selected one of the orifices, for example orifice 87 in conduit 85 has a pressure responsive flow control valve 88 provided in series therewith. The flow control orifices maintain the flow of oil through seals 20, 40 and 41 at desired levels. At low seal oil pressure, both orifices 86 and 87 will be operable to insure adequate oil flow through the seals. At higher pressures, a selected one orifice, for example orifice 87, is rendered inoperable via the closing of valve 88. The pressure at which valve 88 will close is determined by the seal oil system flow capacity.

The seal oil flowing through seal 20 to the barrier region is drained from the barrier region via contaminated drain groove 90 passing through the machine end wall structure (see FIG. 1). Groove 90 terminates in line 91 illustrated in FIG. 2. A signal indicative of the pressure in drain line 91 is transmitted to storage tank 80. As storage tank 80 is elevated, the pressure of the oil flowing through line 81 will always be above the pressure in the barrier region.

The buffer gas is furnished to inlet groove 58 and injection region 60 via line 92 having a pressure responsive flow control valve 93 disposed therein. The function of valve 93 shall be more fully explained hereinafter.

From injection region 60, the buffer gas flows axially in opposite directions along shaft 11. As noted previously, labyrinth seal 16 is longer than seal 66 and thus restricts the flow of gas toward region 12 to a greater degree than does seal 66 in restricting the flow of gas to the barrier region 61 defined by the seal oil buffer gas interface. As may be recognized, it is essential that the buffer gas flow to the barrier region be sufficient to maintain the gas pressure above the oil pressure to prevent the oil from flowing in a reverse direction through seal 66, that is, from the barrier region toward injection region 60. By providing a greater restriction between regions 60 and 12, a substantial portion of the buffer gas injected into region 60 passes to the barrier region.

The buffer gas in the barrier region will mix with the seal oil and drain from the rotary machine via groove 90 and line 91. Line 91 terminates in a pair of conduits 94, 95; each of the conduits has a flow control orifice, respectively 96 and 97 disposed therein. A pressure responsive flow control valve 98 is provided in series with a selected one of the orifices, for example orifice 97. Valve 98 is responsive to the pressure in conduit 95. At low pressures in line 95 both orifices will be operable; whereas, at higher pressures, valve 98 will close to terminate flow through orifice 97.

A line 99 communicates valve 93 with line 91. Valve 93 is thus made responsive to the pressure in contaminated drain line 91.

If the pressure at region 12 should decrease and even approach vacuum conditions, the pressure differential between regions 60 and 12 will increase, tending to drive a greater proportion of the buffer gas toward region 12, with a resultant decrease in the flow of gas toward the barrier region. The ensuing reduction in pressure in line 91 will be transmitted to valve 93, causing the valve to open to pass a greater quantity of buffer gas to injection region 60.

Conversely, if the pressure in region 12 increases, the pressure differential across seal 16 will be reduced, with a resulting greater flow of gas passing through seal 66 to the barrier region. The increased flow of buffer gas will increase the pressure in line 91, with line 99 transmitting the new pressure signal to valve 93 causing the valve to reduce the flow of gas to injection zone 60.

The seal system thus described readily adjusts for changes in inlet pressure of a rotary machine, thereby insuring a sufficient supply of buffer gas, with minimal excess flow thereof. By varying the flow of gas to injection zone 60, the flow of buffer gas toward the barrier region will remain substantially constant irrespective of changes in pressure in region 12.

While a preferred embodiment of the instant invention has been described and illustrated, the invention should not be limited thereto but may be otherwise embodied within the scope of the following claims.

We claim:

1. In a shaft seal system of the type to prevent pressurized working substances contained within a rotary machine from escaping to surrounding areas of relatively lower pressure, the improvement comprising:

first restriction means provided between a high pressure region and a first region operating at a relatively lower substantially constant pressure;

second restriction means provided between said high pressure region and a second region operating at a varying relatively lower pressure, said second restriction means providing a flow restriction of a greater magnitude than said first restriction means;

conduit means to deliver a buffer fluid to said high pressure region whereat said fluid will flow axially in opposite directions along said shaft to said first and second regions, the flow of fluid toward said second region being restricted to a greater degree than the flow of the fluid toward said first region; and means to monitor the change of flow of buffer fluid through said first and second regions resulting from changes in the operating pressure in said second region including valve means disposed in said conduit means and connected to said monitoring means to regulate the flow of buffer fluid to said high pressure region to maintain the flow of fluid toward said first region substantially constant irrespective of changes in the operating pressure of said second region.

2. A shaft seal system in accordance with claim 1 including:

means to deliver a sealing fluid to a third region of said rotary machine, said first restriction means being disposed between said high pressure region and said third region, said second fluid flowing axially along said shaft toward said first restriction means, the pressure developed by said buffer fluid flowing through said first restriction means preventing said sealing fluid from flowing into said first restriction means.

3. A shaft seal system in accordance with claim 2 including:

drain means disposed between said first restriction means and said third region to receive said buffer and sealing fluids and deliver the combined flow thereof to a storage vessel, said drain means including drain conduit means having a pair of flow control orifices disposed in parallel relation to control the flow of fluid to said storage vessel; and pressure sensing means to stop the flow of fluid through a selected one of said orifices when the pressure of said buffer fluid exceeds a predetermined magnitude.

4. A method of preventing pressurized working substances within a rotary machine from escaping to surrounding areas of relatively lower pressure comprising the steps of:

supplying a first fluid to an injection zone, said fluid flowing axially in both directions along the shaft of the rotary machine from a relatively high pressure region to relatively low pressure regions;

restricting the flow of fluid in each direction along said shaft, with the fluid flowing in one direction being restricted to a greater degree than the fluid flowing in the opposite direction;

varying the operating pressure downstream of the restriction provided in the flow path of the fluid flowing in said one direction whereby the quantity of fluid flowing through the restriction will vary inversely with changes in said operating pressure;

maintaining the operating pressure substantially constant downstream of the restriction provided in the flow path of the fluid flowing in said opposite direction whereby the quantity of fluid passing therethrough will vary inversely with the quantity of fluid flowing in said one direction;

monitoring the change of flow in fluid through the restrictions as a result of changes in the operating pressure; and varying the quantity of fluid supplied to said high pressure region in accordance with the monitored changes of the flow of fluid through the restrictions to maintain the quantity of fluid flowing in said opposite direction substantially constant.

* * * * *